United States Patent
Von Berg et al.

(10) Patent No.: US 7,986,836 B2
(45) Date of Patent: Jul. 26, 2011

(54) METHOD, A SYSTEM AND A COMPUTER PROGRAM FOR SEGMENTING A SURFACE IN A MULTIDIMENSIONAL DATASET

(75) Inventors: Jens Von Berg, Hamburg (DE); Cristian Lorenz, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 877 days.

(21) Appl. No.: 11/815,453

(22) PCT Filed: Feb. 6, 2006

(86) PCT No.: PCT/IB2006/050379
§ 371 (c)(1),
(2), (4) Date: Aug. 3, 2007

(87) PCT Pub. No.: WO2006/085257
PCT Pub. Date: Aug. 17, 2006

(65) Prior Publication Data
US 2008/0205757 A1 Aug. 28, 2008

(30) Foreign Application Priority Data
Feb. 10, 2005 (EP) .................................. 05100961

(51) Int. Cl.
*G06K 9/34* (2006.01)
(52) U.S. Cl. .................................................. 382/173
(58) Field of Classification Search .............. 382/103, 382/107, 118, 128, 131, 132, 151, 154, 173, 382/199, 203, 295; 128/922; 378/4; 600/410; 345/419, 621
See application file for complete search history.

(56) References Cited

U.S. PATENT DOCUMENTS

| | | | | |
|---|---|---|---|---|
| 6,591,004 B1 * | 7/2003 | VanEssen et al. | | 382/154 |
| 7,421,101 B2 * | 9/2008 | Georgescu et al. | | 382/128 |
| 7,499,578 B2 * | 3/2009 | Reeves et al. | | 382/131 |
| 7,542,622 B1 * | 6/2009 | Angelini et al. | | 382/275 |

(Continued)

OTHER PUBLICATIONS

Bardinet, E., et al.; Tracking medical 3D data with a parametric deformable model; 1995; IEEE Computer Vision; pp. 299-304.

(Continued)

*Primary Examiner* — Jose L Couso

(57) ABSTRACT

The invention relates to a method of segmenting a surface in a multi dimensional dataset comprising a plurality of images. In accordance with the method of the invention, at step 4 shape parameters and topology parameters for the object under consideration are acquired. Preferably that the multi-dimensional data set imaging the object is acquired at an acquisition step 1 and is subsequently stored in a computer-readable file 2. At step 5 the default shape parameters and topology parameters of a suitable segmentation algorithm 3 based on a deformable model are adapted with the value of the actual shape parameters and the topology parameters 4 for the given object. Subsequently, at step 6 the images constituting the multi-dimensional dataset are segmented using deformable model algorithm 6*a* with the adapted shape parameters and the adapted topology parameters yielding respective portions of the sought surface. After all sub-portions of the segmented surface are obtained for all images, the surface is tracked using per se known tracking algorithms 8*a* resulting in establishing spatial correspondence between said surface portions. Preferably, the method according to the invention is followed by the step of reconstructing 9 wherein for a given viewing angle the surface is reconstructed in virtual space. At step 11 the reconstructed surface is visualized on a suitable display means for user's analysis.

10 Claims, 6 Drawing Sheets

Figure 1:
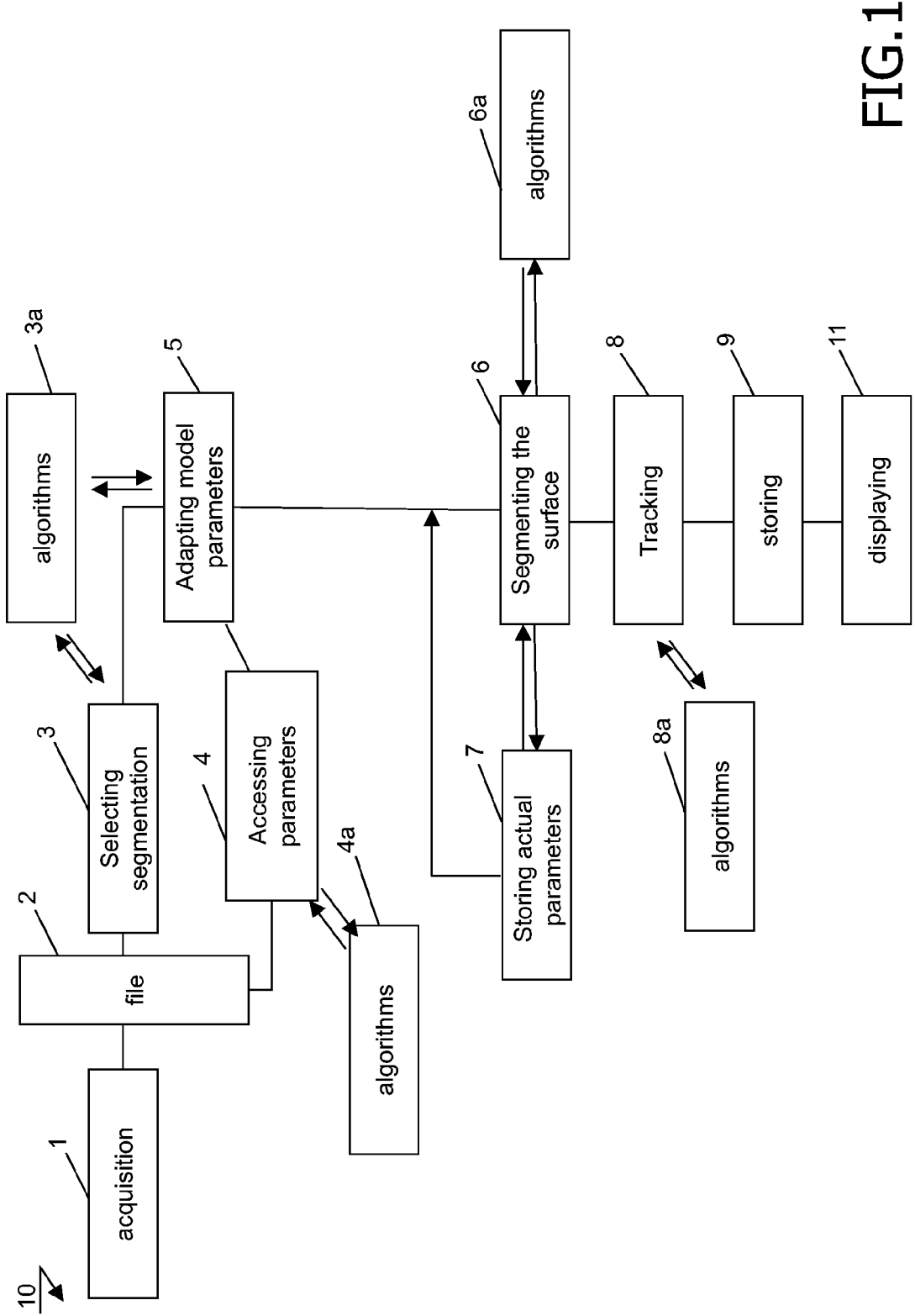

U.S. PATENT DOCUMENTS 7,650,025 B2 * 1/2010 Guetat et al. .................. 382/128
2003/0069494 A1 4/2003 Jolly

OTHER PUBLICATIONS

Bascle, E., et al.; Region tracking through image sequences; 1995; IEEE Computer Vision; pp. 302-307.

Kaus, M. R., et al.; Automated segmentation of the left ventricle in cardiac MRI; 2003; Lecture Notes in Computer Science; 2879(1)432-439.

Lorenzo-Valdes, M., et al.; Atlas-based segmentation of 4D cardiac MR sequences using non-rigid registration; 2002; http://www3.cmp.uea.ac.uk.

McInerney, T., et al.; Deformable models in medical image analysis: a survey; 1996; Medical Image Analysis; 1(2) 91-108.

Pham, Q. C., et al.; A FEM-based deformable model for the 3D segmentation and tracking of the heart in cardiac MRI: 2001; Proc. 2nd Int'l Symposium on Image and Signal Processing and Analysis; pp. 250-254.

Weese, J., et al.; Shape constrained deformable models for 3D medical image segmentation; 2001; Proc. IPMI; LNCS 2082; 380-387.

Wong, A., et al.; Spatiotemporal active region model for simultaneous segmentation and motion estimation of the whole heart; 2003; http://www.inrialpes.fr/lear/people/triggs/events/iccv03/cdrom/vlsm03.

Jang, D., et al.; Moving Object Tracking using Active Models; 1998; Proc. 1998 Int'l. Conf. Image Processing; vol. 3; pp. 648-652.

* cited by examiner

METHOD, A SYSTEM AND A COMPUTER PROGRAM FOR SEGMENTING A SURFACE IN A MULTIDIMENSIONAL DATASET

The invention relates to a method of segmenting a surface in a multi-dimensional dataset comprising a plurality of images.

The invention still further relates to a system for enabling a segmentation of a surface in a multi-dimensional dataset comprising a plurality of images.

The invention still further relates to a computer program for segmenting a surface in a multi-dimensional dataset comprising a plurality of images.

An embodiment of a method as is set forth in the opening paragraph is known from the publication J. Weese et al "Shape Constrained Deformable Models for 3D Medical Image Segmentation", Proc. IPMI 380-387, 2001. The known method is in particular arranged to improve the robustness of an image segmentation method using a prior shape information about an object conceived to be segmented. In the known method the shape information is embedded into an elastically deformable surface shape model, whereby adaptation to the image is governed by an external energy which is derived from local surface detection and an internal energy, which constrains the deformable surface to stay close to the subspace defined by the shape model.

It is a disadvantage of the known method that its reliability is highly dependent on accuracy of elastic constrains which are arranged to describe a motion of a movable body. In order to solve corresponding equations substantial computation time is required which may not be acceptable is everyday clinical practice.

It is an object of the invention to provide a method for segmenting a surface in a multi-dimensional dataset, whereby the method is arranged to automatically learn local shape and appearances from the original image data, thus improving the segmentation accuracy and reducing computation time necessary to segment the surface.

To this end the method according to the invention comprises the following steps:

selecting an image segmentation algorithm based on a deformable surface model comprising an a-priori constructed shape model and an a-priori constructed topology model, whereby the shape model is characterized by first parameters and the topology model is characterized by second parameters;

accessing pre-determined shape parameters and topology parameters of the surface;

adapting the first parameters and the second parameters based on the shape parameters and the topology parameters yielding adapted first parameters and adapted second parameters;

segmenting the surface in the multi-dimensional dataset using said image segmentation algorithm with the adapted first parameters and the adapted second parameters yielding respective portions of the surface for each segmented image;

tracking the surface in the multi-dimensional dataset to establish spatial correspondence between said surface portions.

The technical measure of the invention is based on the insight that in order to enable an accurate detection and measurement of movements of organs two separate tasks have to be solved. Firstly, the organ of interest must be segmented from each image constituting the multi-dimensional dataset and secondly, the right correspondences between image parts must be established over the timeline of the image series, at least for those image parts that belong to the target organ. The method according to the invention uses a once established segmentation of the target organ for any given point in time and builds a surface model from it. Preferably, the segmentation is carried out using a suitable deformable surface model. The method according to the invention holds shape and topology properties of the organ which are used to yield a segmentation of the organ in other, preferably subsequent points in time with surface model landmarks following the anatomic features and thus establish correspondence over time. The deformable surface model used to segment the other images in the sequence profits from both the shape model and the topology model taken from the initial image. This prior knowledge is used both to initialize the parameters and to constrain shape deviation. Due to the local features corresponding to model surface points, these model points will follow anatomical landmarks on the organ surface even when it gets deformed.

The invention is based on a per se known image segmentation method using deformable models. An example of the image segmentation method using deformable models is known from McInerney and Terzopoulous, Med. Ing. Anal. 1(2): 91-108, 1996. In the method according to the invention it is assumed that the surface mesh is adapted to the organ surface in at least one image volume. This can have been done automatically or interactively. The geometry of this mesh is used as reference model and as initialization for the adaptation procedure in other image volumes. Details of the adaptation procedure are given below. The mesh is made of a number of vertices v and triangles t. It may be topologically opened or closed. The number of triangles as well as their topology is assumed to be unchanged during the tracking. The positions of the vertices $\hat{v}_j$ constitute the shape model. In addition to these shape parameters, also image appearance is modeled. A vector of intensity gray values $\hat{g}_i = I(p_{i,k})$ is taken. The sampling positions are given by $p_{i,k} = m_i + R_i s_k$ where $m_i$ is the center of mass of the triangle and $R_i$ is a rotation matrix that transforms vector $|0,0,1|$ into the triangle normal $n_i$. Thus, an offset $s_k = |0,0,0|$ gives $p_{i,k} = m_i$ and $s_k = |0,0,1|$ gives $p_{i,k} = m_i + n_i$, a position 1 mm outside the mesh. These vectors $\hat{g}_i$ (one for each triangle i) make up the appearance model of the organ. It is noted that the vector of gray values $\hat{g}$ may be each normalized, e.g. to have zero average and standard deviation of 1.0. In this case also gray value vectors in the feature term $F(x_i)$ have to be normalized accordingly.

For tracking the surface in the multi-dimensional dataset in order to establish correspondence between thus established surface portions the following procedure is followed. A deformable surface model approach is used for tracking that also uses the shape model and the topology model as priors. The deformable surface is initialized by the parameter of the shape model $\hat{v}_i$—that means the extracted position of, for example, the organ in the initial image volume. Preferably, an energy minimization scheme is used for the deformation of each vertex positions $v_i$. The energy to be minimized is given by $E = E_{ext} + \alpha E_{int}$. The internal energy is given by $$E_{int} = \sum_j \sum_{k \in N(j)} ((\hat{v}_j - \hat{v}_k) - (v_j - v_k))^2$$

with $\hat{v}_i$ being shape model vertex position and $v_i$ being the position of the deformable surface mesh vertex (N(j) gives all neighbor indices of vertex number j). The special optimization method works with a discrete number of candidates for each $m_i$ in each step. The external energy is given by $$E_{ext} = \sum_i w_i \tilde{o}_k^2.$$

The additional weight $w_i$ is given by $w_i=1$ or by $w_i=\max\{0, F(\tilde{p}_{i,k})-\delta\|\tilde{o}_k\|^2\}$ with $\tilde{p}_{i,k}=m_i+R_i\tilde{o}_k$. The most attractive candidate $m'_i$ is determined by $$m'_i = \arg\max_{k=1\ldots n}\{F(\tilde{p}_{i,k}) - \delta\|\tilde{o}_k\|^2\}.$$

The term $\delta\|\tilde{o}_k\|^2$ penalizes those candidates that are more distant from current position. The image feature strength $F(x_i)$ at image position $x_i$ for triangle i is defined by $$F(x_i) = \frac{n}{\sum_{k=1\ldots n}(l(x_i + R_i\tilde{o}_k) - \hat{g}_{i,k})^2}$$

where $\hat{g}_i$ is the vector of gray values from the appearance model. The parameters are $\alpha$ and $\delta$, as well as the shape of the sampling grids s and the candidate point set o. For o a multi-icosahedron grid is used that results in candidate points surrounding $m_i$ in all directions and at different distances.

In an embodiment of the method according to the invention, the method comprises the following steps:
reconstructing the surface in a multi-dimensional space using spatial correspondence between surface portions;
visualizing the reconstructed surface on a display means.

It is found to be particularly advantageous to use the method according to the invention as a technical add in various cardiac studies. The human heart is a dedicated target organ for the invention as it shows a complex motion pattern but remains topologically stable. In cardiac diagnostics it is more and more desired to assess local motion patterns, e.g. to relate local perfusion and/or angiographic data about the coronaries with local myocardium contraction performance in stroke patients. The acquisition of motion and deformation patterns is also required to build a geometric model of the beating heart. By visualizing the reconstructed surface of, for example myocardium, left, or right ventricle to a suitable medical specialist, an accurate detection and/or quantification of motion is enabled. Still preferably, the visualization means are further arranged to visualize the trajectories of surface points in time. This technical measure enables visualization of movement of the object, which is particularly advantageous for motion studies.

In a further embodiment of the method according to the invention, the step of accessing the shape parameters and the topology parameters of the surface comprises the following sub-steps:
accessing a result of a segmentation step of a single, preferably initial image from said plurality of images, said result comprising information on shape and topology of the surface;
deducing shape parameters and topology parameters for the surface from said results.

It is found to be preferable to determine the shape and topology parameters of the surface using the automatic means, like the image segmentation step. Still preferably, for the segmentation step a segmentation using a deformable surface model is used. In this way a fully automatic method for segmenting a surface in a multi-dimensional dataset is provided, whereby no interaction with an operator is necessary. This embodiment of the method according to the invention still further improves a workflow of image analysis.

In a still further embodiment of the method according to the invention, the method comprises the steps of:
for any subsequent image in said plurality of images using for the adapted first parameters and the adapted second parameters the shape parameters and the topology parameters of a preceding image deduced from the results of the image segmentation of the preceding image.

It is found to be particularly advantageous to instead of learning the shape model $\hat{v}$ and the topology model $\hat{g}$ from one, preferably initial image of a sequence like in a sequence of t=0 ... n, the tracking in image t=a uses the resulting shape from t=a−1. Topology model $\hat{g}$ is taken from image t=a−1 at positions given by this shape model $\hat{v}$. This establishes a sliding model that takes both its shape and topology expectations from the previous image in time. This may be advantageous in cases of strong deviation from initial state. A previous segmentation for the particular initial image t=0 is necessary in this case.

The system according to the invention comprises:
a processing unit operable to run a subroutine comprising an image segmentation algorithm based on a deformable surface model comprising an a-priori constructed shape model and an a-priori constructed topology model, whereby the shape model is characterized by first parameters and the topology model is characterized by second parameters;
a storage unit arranged to store pre-determined shape parameters and topology parameters of the surface;
a computing unit arranged to:
(i) adapt the first parameters and the second parameters based on the shape parameters and the topology parameters yielding adapted first parameters and adapted second parameters;
(ii) segment the surface in the multi-dimensional dataset using said image segmentation algorithm with the adapted first parameters and the adapted second parameters yielding respective portions of the surface for each segmented image;
(iii) track the surface in the multi-dimensional dataset to establish spatial correspondence between said surface portions.

In an embodiment of the system according to the invention, the system further comprises:
a reconstruction unit arranged to reconstruct the surface in a multi-dimensional space using spatial correspondence between surface portions;
a display means arranged to visualize the reconstructed surface.

This embodiment is particularly suitable in situations where data analysis is performed at the same site as data processing, like, for instance, at diagnostic department of a hospital. Still preferably, the display means is further arranged to visualize the trajectories of surface points of the object, which is particularly advantageous for motion studies.

In a further embodiment of the system, the system further comprises:
a data acquisition unit arranged to acquire the multi-dimensional dataset.

This embodiment of the system according to the invention enables a provision of a fully self-contained data acquisition and analysis system, still improving the workflow.

The computer program according to the invention comprises instructions to cause a processor to carry out the following steps:
selecting an image segmentation algorithm based on a deformable surface model comprising an a-priori constructed shape model and an a-priori constructed topology model, whereby the shape model is characterized by first parameters and the topology model is characterized by second parameters;

accessing pre-determined shape parameters and topology parameters of the surface;

adapting the first parameters and the second parameters based on the shape parameters and the topology parameters yielding adapted first parameters and adapted second parameters;

segmenting the surface in the multi-dimensional dataset using said image segmentation algorithm with the adapted first parameters and the adapted second parameters yielding respective portions of the surface for each segmented image;

tracking the surface in the multi-dimensional dataset to establish spatial correspondence between said surface portions.

These and other aspects of the invention will be discussed with reference to figures.

FIG. 1 presents in a schematic way an embodiment of a flow-chart of the method according to the invention.

Figure 2:
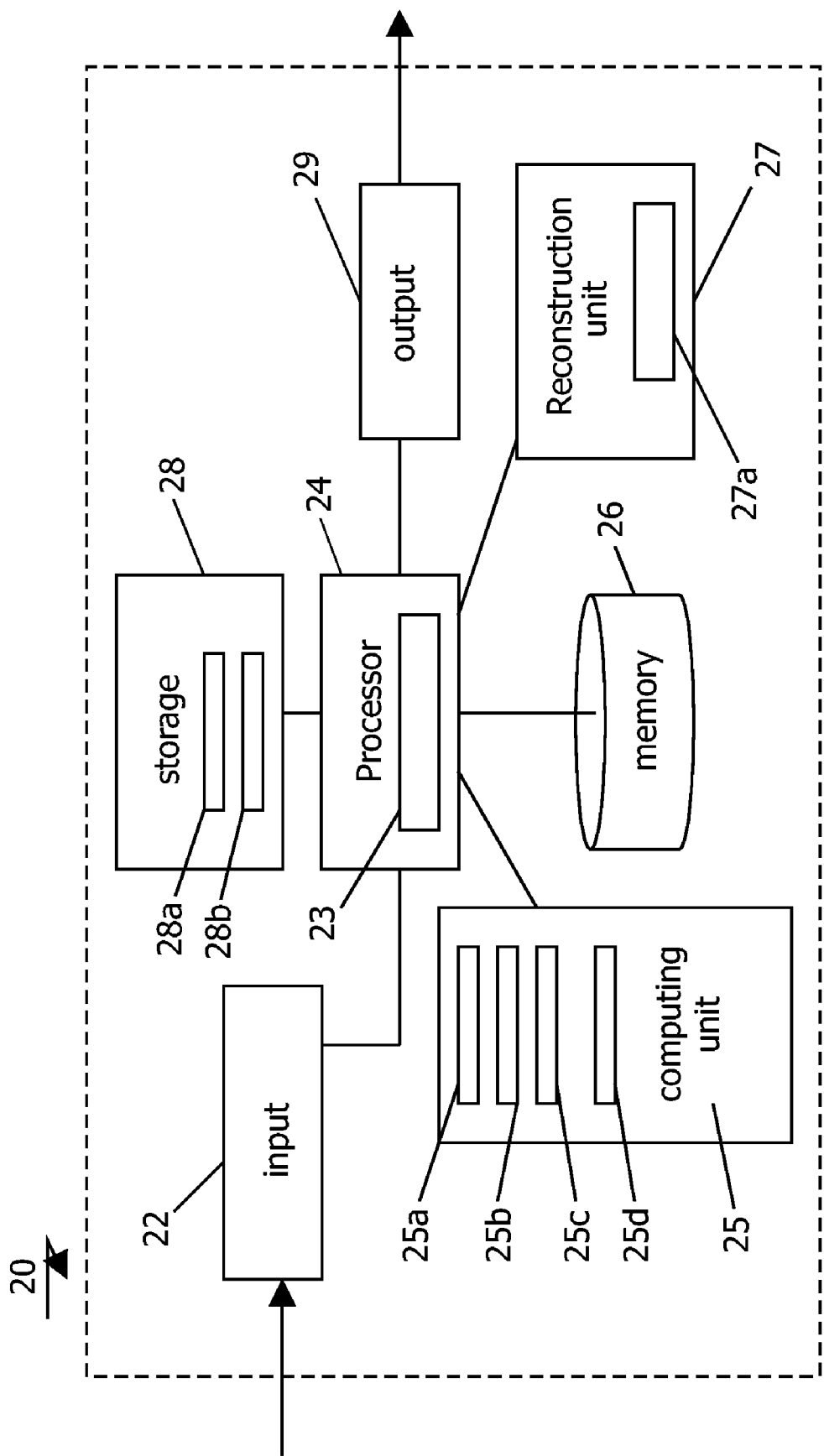

FIG. 2 presents in a schematic way an embodiment of the system according to the invention.

Figure 3:
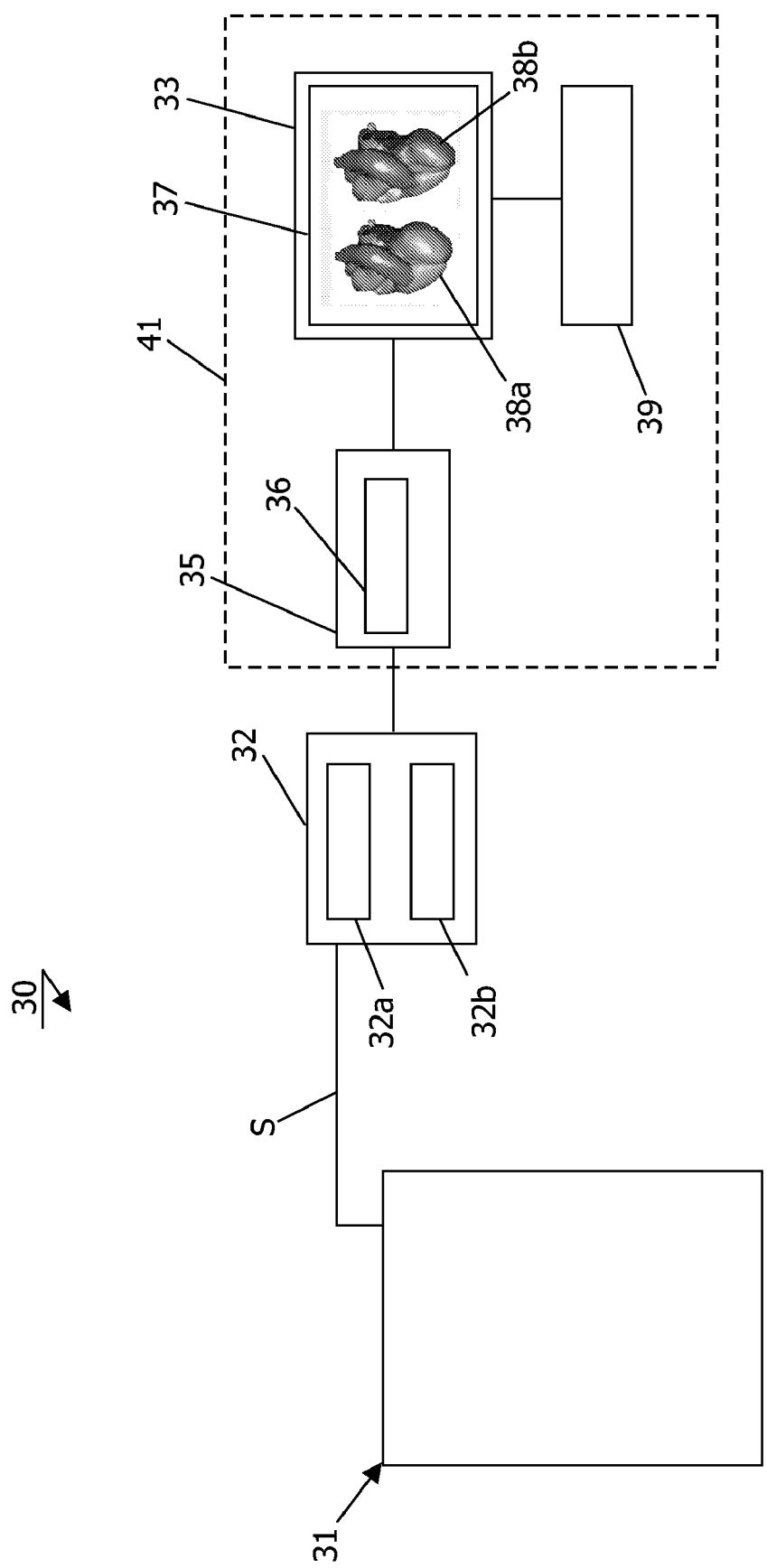

FIG. 3 presents in a schematic way a further embodiment of the system according to the invention.

Figure 4:
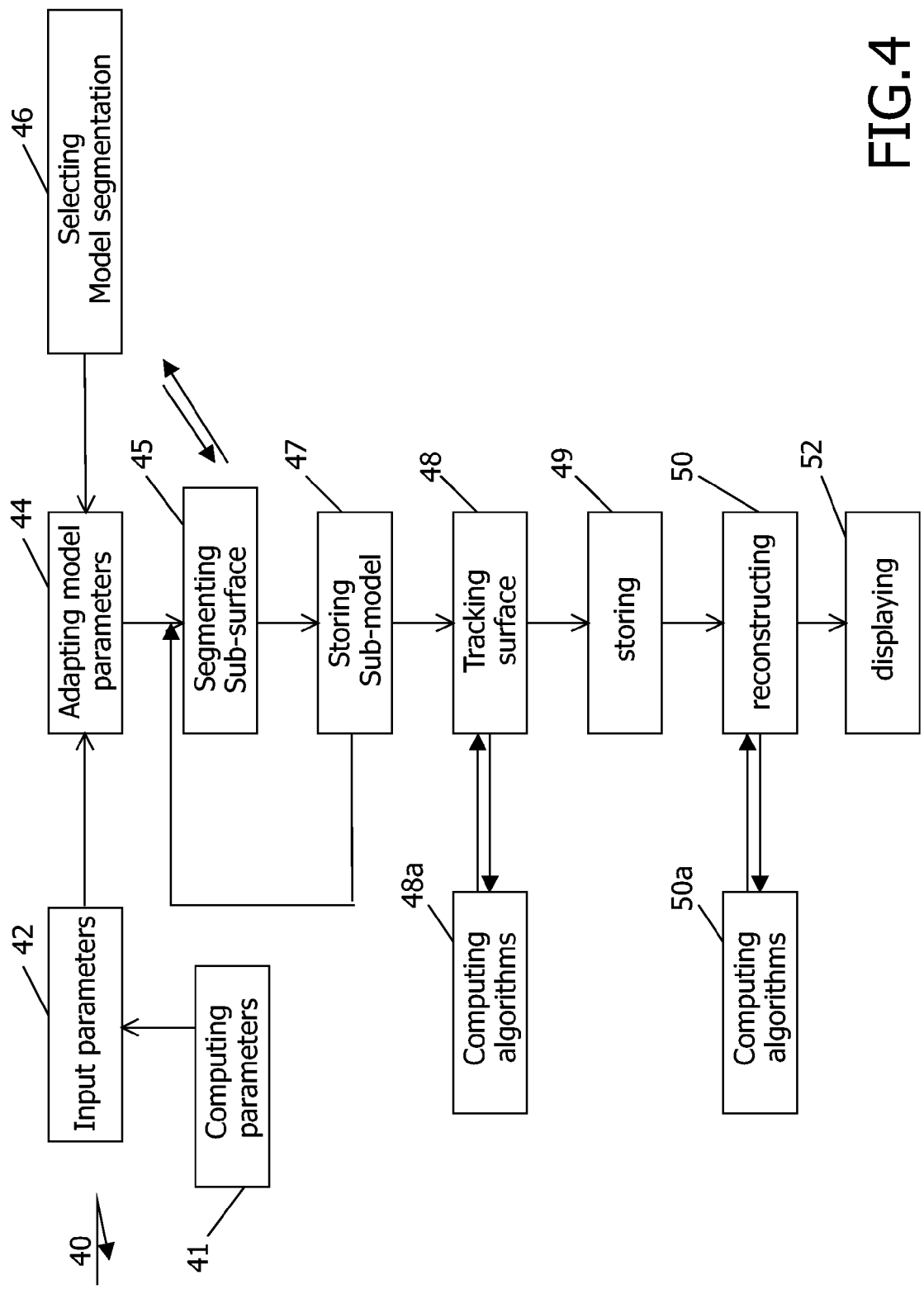

FIG. 4 presents in a schematic way an embodiment of a flow-chart of the computer program according to the invention.

Figure 5:
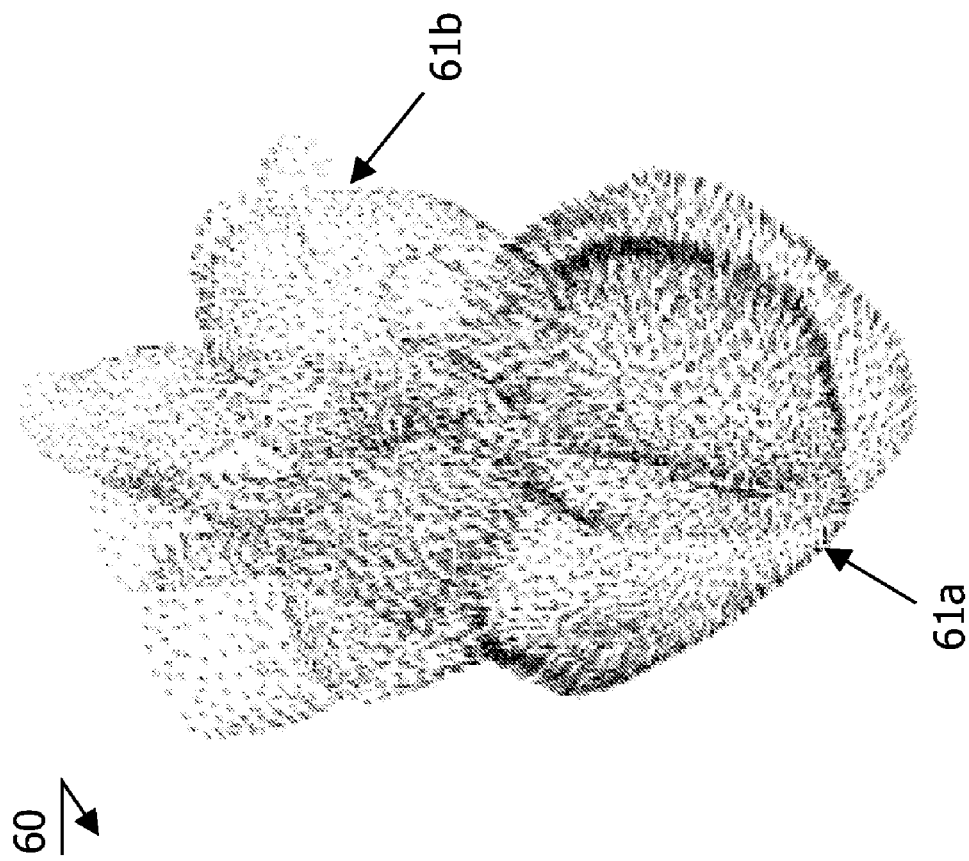

FIG. 5 presents in a schematic way an embodiment of visualized trajectories of surface points of the object.

Figure 6:
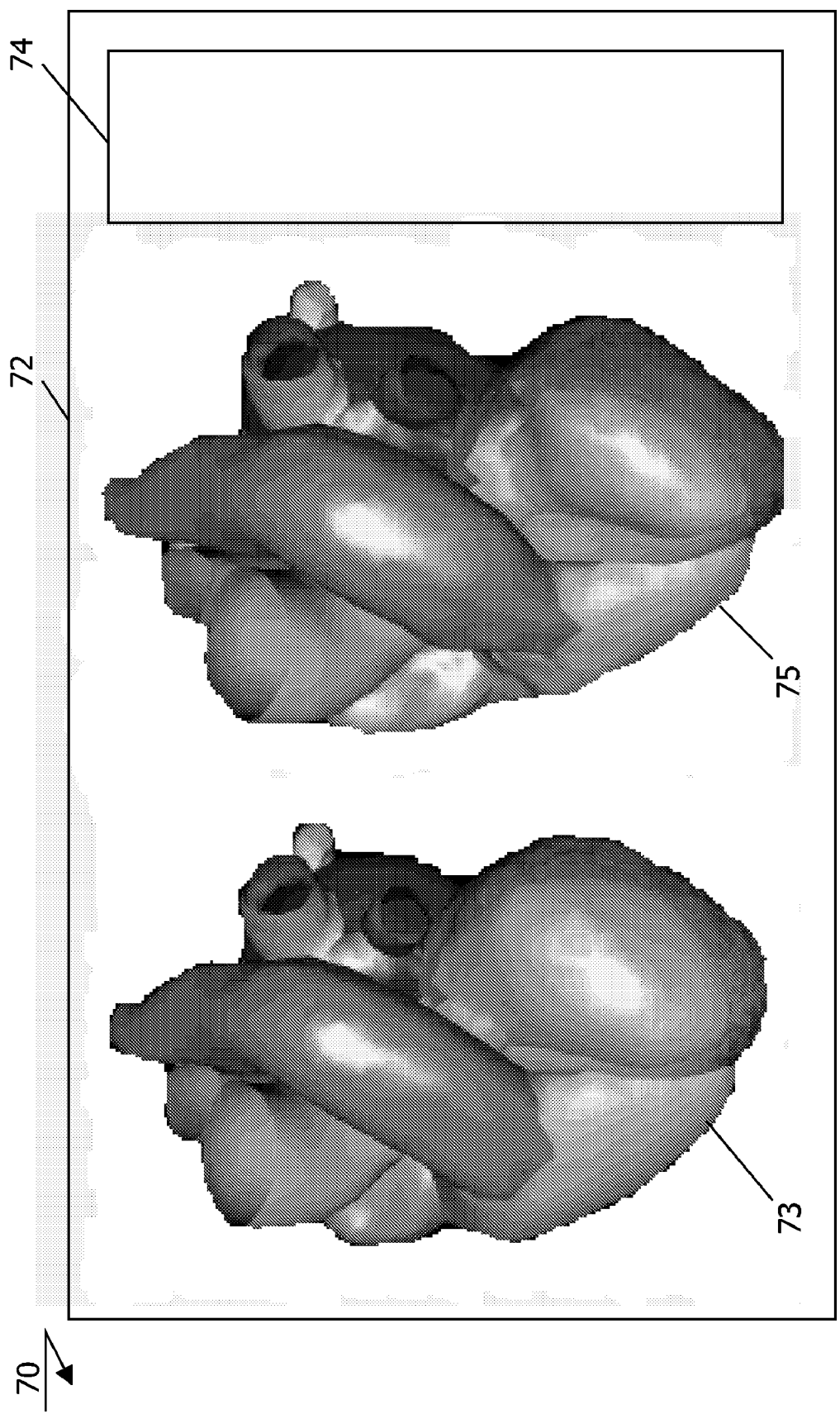

FIG. 6 presents in a schematic way an embodiment of visualized segmented surfaces of the object.

FIG. 1 presents in a schematic way an embodiment of a flow-chart 10 of the method according to the invention. In accordance with the method of the invention, at step 4 shape parameters and topology parameters for the object under consideration are acquired. It is noted that various ways of said acquisition are envisaged. First, it is possible to select a sole image from the multi-dimensional dataset representing the object and to automatically segment the surface using a suitable model-based segmentation algorithm. The result yields both shape parameters and topology parameters of the surface. Preferably, in this case the same model-based segmentation algorithm is used as the segmentation algorithm 3 envisaged for practicing the invention. It is preferable that the multi-dimensional data set is acquired at an acquisition step 1 and is subsequently stored in a computer-readable file 2. These steps may as well be carried out at a different location with respect to the data processing location. Secondly, it is possible that the sought surface is segmented manually from a sole image in the dataset. The resulting surface is then subjected to a suitable image analysis routine 4a for deducing shape parameters and topology parameters of the delineated surface. Still alternatively, it is possible that at some pre-processing step the shape parameters and topology parameters are derived and are stored in the file 2. In this case they are accessed, preferably using suitable computer means. Remote acquisition by means of internet or like connection to a remote host is also possible. All necessary computation steps for carrying out first steps of the method according to the invention are carried out using suitable programmable computation algorithms 3a. At step 5 the default shape parameters and topology parameters of the segmentation algorithm 3 based on a deformable model are adapted with the value of the actual shape parameters and the topology parameters 4 for the given object. Also here suitable computation algorithms 3a are used. Subsequently, at step 6 the images constituting the multi-dimensional dataset are segmented using deformable model algorithm 6a with the adapted shape parameters and the adapted topology parameters yielding respective portions of the sought surface. The results of the image segmentation steps are stored at step 7. It is noted that with respect to the image segmentation step several embodiments of the invention are envisaged. Firstly, it is possible to use the shape parameters and the topology parameters obtained from the sole, preferably initial image of the multi-dimensional dataset for segmenting all images. Alternatively, it is possible to design a so-called sliding model, whereby after a portion of the surface for i-th image is segmented the shape parameters and the topology parameters thereof are used for segmenting the i-th image in the dataset. This feature is particularly advantageous for situations where a strong deviation in shape and/or topology with respect to the initial state is expected. For the implementation of the latter embodiment a precious segmentation for the initial image is necessary giving a basis for the sliding model algorithm. It is further noted that the multi-dimensional dataset must be interpreted as either a series of two-dimensional images sequentially acquired in time, or a series of three-dimensional images sequentially acquired in time. Examples of such acquisitions are magnetic resonance imaging or computer tomography images, particularly for cardiac motion studies.

After all sub-portions of the segmented surface are obtained for all images, the surface is tracked at step 8 using per se known tracking algorithms 8a resulting in establishing spatial correspondence between said surface portions. Preferably, the method according to the invention is followed by the step of reconstructing 9 wherein for a given viewing angle the surface is reconstructed in virtual space. At step 11 the reconstructed surface is visualized on a suitable display means for user's analysis. This embodiment is further discussed with reference to FIG. 6. Preferably, the visualization is animated, thus emphasizing the motion pattern of the object. Also, in order to further ease the analysis of the motion pattern, it is possible that the individual trajectories of surface points of the object are shown. This particular embodiment is discussed with reference to FIG. 5.

FIG. 2 presents in a schematic way an embodiment of the system according to the invention. The system 20 comprises an input 22 for accessing pre-determined shape parameters and topology parameters of the surface of the object. The derivation of these parameters, preferably using a suitable image segmentation step of a suitable medical diagnostic data may be carried out on a different hard-ware, or, alternatively it may be implemented as a preparatory step for practicing the invention using the same hard-ware. In the latter case, the input 22 may be arranged to receive the parameters in any suitable form. For example, the system 20 may be involved in the acquisition of the suitable multi-dimensional dataset. In this case the all necessary data, like, for example cine scan and contrast-enhanced scan for cardiac imaging, may be acquired in an analogue form and converted using a suitable A/D converter to a digital form for further processing. The multi-dimensional dataset may also be received in a digital form, e.g. through a direct acquisition thereof in a digital form or via a computer network after having been acquired by another computer/medical instrument. The multi-dimensional dataset is then made available by the input 22 to a processing unit 25 of the system 20, which is arranged to carry out the image segmentation using suitable model-based segmentation algorithm 23 yielding the surface of the object.

The core of the system 20 is formed by a processor 24 which is arranged to operate the components of the system 20, it being the input 22, the computing unit 25, a working memory 26, a background storage unit 28. An example of a suitable processor 24 is a conventional microprocessor or signal processor, a background storage 28 (typically based on a hard disk) and working memory 26 (typically based on RAM). The background storage 28 can be used for storing suitable data (or parts of it) when not being processed, and for storing results of the image segmentation step, the step of determining shape parameters 28a and topology parameters 28b and results of any other suitable intermediate or final computational steps. The working memory 26 typically holds the (parts of) dataset being processed and the results of the image segmentation step and the results of surface. The computing unit 25 preferably comprises a suitable number of executable subroutines 25a, 25b, 25c, 25d. The subroutine 25a is arranged to adapt the shape parameters of the model and the subroutine 25b is arranged to adapt the topology parameters of the model by the values of the shape parameters and the topology parameters of the surface of the object under consideration. The subroutine 25c is arranged to calculate respective portions of the surface for each segmented image in the multi-dimensional dataset. The subroutine 25d is arranged to track the surface in the multi-dimensional dataset by establishing spatial correspondences between surface portions. Per se known computing algorithms can be used for this purpose.

The system 20 according to the invention preferably further comprises a reconstruction unit 27 arranged to reconstruct the surface in virtual space using the established spatial correspondences between the surface portions. For this purpose a per se known image reconstruction method 27a may be used. Preferably, the reconstruction unit 27, the computing unit 25 and the processor 24 are operable by a computer program 23 according to the invention. An output 29 is used for outputting the results of the processing, like the reconstructed surface, preferably represented by an animated geometric model of the object.

FIG. 3 presents in a schematic way a further embodiment of the system according to the invention. The system 30 is arranged for enabling a segmentation of a surface in a multi-dimensional dataset 32a based on the image dataset acquired using a suitable data acquisition unit 31, said segmentation being carried out by a processor 32. For purposes of medial imaging, notably cardiac motion studies, the suitable medical diagnostic apparatus may comprise a per se known magnetic resonance imaging apparatus or a computer tomography unit, preferably operating in a multi-phase multi-slice mode.

The output of the processor 32 comprises the segmented, preferably reconstructed surface 32b of the object, notably the human heart. Suitable surfaces comprise at least the following: left ventricle, right ventricle, atria, aorta, pulmonary artery and vene trunks. The output of the processor 32 is made available to a further input 35 of a suitable viewer 41. Preferably, the further input 35 comprises a suitable further processor arranged to operate a suitable interface using a program 36 adapted to control a user interface 37 so that an image of the segmented surface 38a, 38b, preferably presented as an animated geometric model is visualized. Preferably, different sub-surfaces constituting the surface of the object are displayed using respective color-coding to ease their perception by the user. Still preferably, the visualized surfaces are presented in a looped animation video. For example, the image 38a may present a situation in a certain time moment, for example end-systolic or end-diastolic phase, while the image 38b may present a looped animation of the beating heart. Preferably, for user's convenience, the viewer 41 is provided with a high-resolution display means 33, the user interface being operable by means of a suitable interactive means 39, for example a mouse, a keyboard or any other suitable user's input device. Preferably, the user interface allows the user to choose and interactively change the visualization mode.

FIG. 4 presents in a schematic way an embodiment of a flow-chart 40 of the computer program according to the invention. At step 42 shape parameters and topology parameters of the surface of the object imaged by means of a multi-dimensional dataset are accessed. Preferably, this step is preceded by the step 41 wherein these parameters are computed. Still preferably, in order to compute the shape parameters and the topology parameters an image, notably an initial image, from a set of images constituting the multi-dimensional dataset is segmented using a segmentation method based on a deformable model. Alternatively, the shape parameters and the topology parameters of the surface may be computed using suitable computation routines from a delineated surface in an image. Still alternatively, the shape parameters and the topology parameters may be read-out from a pre-stored file created during a suitable pre-processing step. At step 46 of the computer program according to the invention an image segmentation algorithm based on a deformable model is selected, notably by initializing an executable computer code. The image segmentation algorithm based on a deformable model comprises a set of pre-defined shape parameters and a set of pre-defined topology parameters. In the method and the computer program according to the invention it is assumed that a surface mesh is adapted to the organ surface in at least one image volume. This can have been done automatically or interactively. The geometry of this mesh is used as reference model and as initialization for the adaptation procedure in other image volumes. Details of the adaptation procedure are given below. The mesh is made of a number of vertices v and triangles t. It may be topologically opened or closed. The number of triangles as well as their topology is assumed to be unchanged during the tracking. The positions of the vertices $\hat{v}_j$ constitute the shape model. In addition to these shape parameters, also image appearance is modeled. A vector of intensity gray values $\hat{g}_i = I(p_{i,k})$ is taken. The sampling positions are given by $p_{i,k} = m_i + R_i s_k$ where $m_i$ is the center of mass of the triangle and $R_i$ is a rotation matrix that transforms vector $|0,0,1|$ into the triangle normal $n_i$. Thus, an offset $s_k = |0,0,0|$ gives $p_{i,k} = m_i$ and $s_k = 0,0,1|$ gives $p_{i,k} = m_i + n_i$, a position 1 mm outside the mesh. These vectors $\hat{g}_i$ (one for each triangle i) make up the appearance model of the organ. It is noted that the vector of gray values $\hat{g}$ may be each normalized, e.g. to have zero average and standard deviation of 1.0. In this case also gray value vectors in the feature term $F(x_i)$ have to be normalized accordingly.

At step 44 the shape parameters and the topology parameters are adapted with the values of the shape parameters and the topology parameters obtained at step 42. At step 45 the images from the multi-dimensional dataset are segmented using the selected image segmentation routine, whereby the adapted shape parameters and the adapted topology parameters are used. It is possible that all images constituting the multi-dimensional dataset are segmented using the same adapted shape parameters and adapted topology parameters. Alternatively, a so-called sliding model may be implemented, whereby at step 47 after a suitable image segmentation step of the i-th image the current shape parameters and the topology parameters are stored and are applied for segmentation of the (i+1)-th image. After all images from the multi-dimensional dataset are segmented the resulting portions of the surface are tracked at the tracking step 48 using suitable computing algorithms 48a, which results in an establishing of a spatial correspondence between these surface portions. For tracking the surface in the multi-dimensional dataset in order to establish correspondence between thus established surface portions the following procedure is followed. A deformable surface model approach is used for tracking that also uses the shape model and the topology model as priors. The deformable surface is initialized by the parameter of the shape model $\hat{v}_i$—that means the extracted position of the organ in the initial image volume. Preferably, an energy minimization scheme is used for the deformation of each vertex position $v_i$. The energy to be minimized is given by $E=E_{ext}+\alpha E_{int}$. The internal energy is given by $$E_{int} = \sum_j \sum_{k \in N(j)} ((\hat{v}_j - \hat{v}_k) - (v_j - v_k))^2$$

with $\hat{v}_j$ being shape model vertex position and $v_j$ being the position of the deformable surface mesh vertex (N(j) gives all neighbor indices of vertex number j). The special optimization method works with a discrete number of candidates for each $m_i$ in each step. The external energy is given by $$E_{ext} = \sum_i w_i \tilde{o}_k^2.$$

The additional weight $w_i$ is given by $w_i=1$ or by $w_i=\max\{0, F(\tilde{p}_{i,k})-\delta\|\tilde{o}_k\|^2\}$ with $\tilde{p}_{i,k}=m_i+R_i\tilde{o}_k$. The most attractive candidate $m'_i$ is determined by $$m'_i = \arg\max_{k=1\ldots n}\{F(\tilde{p}_{i,k}) - \delta\|\tilde{o}_k\|^2\}.$$

The term $\delta\|\tilde{o}_k\|^2$ penalizes those candidates that are more distant from current position. The image feature strength $F(x_i)$ at image position $x_i$ for triangle i is defined by $$F(x_i) = \frac{n}{\sum_{k=1\ldots n}(l(x_i+R_i\tilde{o}_k)-\hat{g}_{i,k})^2}$$

where $\hat{g}_i$ is the vector of grey values from the appearance model. The parameters are $\alpha$ and $\delta$, as well as the shape of the sampling grids s and the candidate point set o. For o a multi-icosahedron grid is used that results in candidate points surrounding $m_i$ in all directions and at different distances.

After the tracking step is accomplished, the results thereof are preferably stored in a suitable file at step 49. At step 50 this file may be accessed by a suitable per se known image reconstruction routine 50a, which reconstructs the surface in virtual space for a given viewing angle. Preferably, the resulting surface is displayed on suitable display means at step 52. Still preferably, the display comprises visualization of an animated surface.

FIG. 5 presents in a schematic way an embodiment 60 of visualized trajectories of surface points of the object. It is found to be advantageous to visualize not only the surface, but to visualize respective trajectories of mesh points modeling the surface. This particular visualization mode is a good aid for tracking motion patterns of the object. Preferably, regions of low motion 61b are identified to the user, as well as regions of high motion 61a. In this case the user is provided with a quasi-quantitative aid for improving his perception of the motion pattern of different regions of the object.

FIG. 6 presents in a schematic way an embodiment 70 of visualized segmented surfaces of the object. Preferably, the visualization is enabled within a suitable computer user-interface 72, like a display screen whereon segmented surfaces 73 and 75 are projected. Preferably, different anatomic regions of the surface 73 are color-coded for simplifying the perception of the user. It is also possible that the image 73 shows a stationary picture, while the image 75 shows an animated picture, looping through different motion phases. This is particularly useful for visualization of a beating heart. Preferably, the user-interface 72 further comprises an interactive window 74, wherein suitable alpha-numerical information is presented. For example, patient data as well as quantitative information on the motion pattern may be projected in the interactive window 74.

The invention claimed is:

1. A method of segmenting a surface in a multi-dimensional dataset comprising a plurality of images, said method comprising the steps of:
    selecting, by a processor, an image segmentation algorithm based on a deformable surface model comprising an a-priori constructed shape model and an a-priori constructed topology model, whereby the shape model includes first parameters and the topology model includes second parameters;
    accessing, by the processor, pre-determined shape parameters and topology parameters of the surface;
    adapting, by the processor, the first parameters and the second parameters based on the shape parameters and the topology parameters yielding adapted first parameters and adapted second parameters;
    segmenting, by the processor, the surface in the multi-dimensional dataset using said image segmentation algorithm with the adapted first parameters and the adapted second parameters yielding respective portions of the surface for each segmented image;
    tracking, by the processor, the surface in the multi-dimensional dataset to establish spatial correspondence between said surface portions.

2. A method according to claim 1, whereby the method further comprises the steps of:
    reconstructing the surface in a multi-dimensional space using spatial correspondence between surface portions;
    visualizing the reconstructed surface on a display means.

3. A method according to claim 1, whereby the step of accessing the shape parameters and the topology parameters of the surface comprises the following sub-steps:
    accessing a result of a segmentation step of a single initial image from said plurality of images, said result comprising information on shape and topology of the surface;
    deducing shape parameters and topology parameters for the surface from said results.

4. A method according to claim 3, whereby the method further comprises the steps of:
    for any subsequent image in said plurality of images using for the adapted first parameters and the adapted second parameters the shape parameters and the topology parameters of a preceding image deduced from the results of the image segmentation of the preceding image.

5. A method according to claim 1, whereby for the multi-dimensional dataset an imaging sequence of a moving object is selected.

6. A method according to claim 5, whereby for the moving object a beating heart is selected.

7. A system for enabling a segmentation of a surface in a multi-dimensional dataset comprising a plurality of images, said system comprising:
- a processor operable to run a subroutine comprising an image segmentation algorithm based on a deformable surface model comprising an a-priori constructed shape model and an a-priori constructed topology model, whereby the shape model includes first parameters and the topology model includes second parameters;
- a storage unit arranged to store pre-determined shape parameters and topology parameters of the surface;
- a computing unit arranged to:
  - (i) adapt the first parameters and the second parameters based on the shape parameters and the topology parameters yielding adapted first parameters and adapted second parameters;
  - (ii) segment the surface in the multi-dimensional dataset using said image segmentation algorithm with the adapted first parameters and the adapted second parameters yielding respective portions of the surface for each segmented image;
  - (iii) track the surface in the multi-dimensional dataset to establish spatial correspondence between said surface portions.

8. A system according to claim 7, whereby the system further comprises:
- a reconstruction unit arranged to reconstruct the surface in a multi-dimensional space using spatial correspondence between surface portions;
- a display means arranged to visualize the reconstructed surface.

9. A system according to claim 7, whereby the system further comprises a data acquisition unit arranged to acquire the multi-dimensional dataset.

10. A computer program embodied on non-transitory computer readable medium for segmenting a surface in a multi-dimensional dataset comprising a plurality of images, said computer program comprising instructions to cause a processor to carry out the following steps:
- selecting an image segmentation algorithm based on a deformable surface model comprising an a-priori constructed shape model and an a-priori constructed topology model, whereby the shape model includes first parameters and the topology model includes second parameters;
- accessing pre-determined shape parameters and topology parameters of the surface;
- adapting the first parameters and the second parameters based on the shape parameters and the topology parameters yielding adapted first parameters and adapted second parameters;
- segmenting the surface in the multi-dimensional dataset using said image segmentation algorithm with the adapted first parameters and the adapted second parameters yielding respective portions of the surface for each segmented image;
- tracking the surface in the multi-dimensional dataset to establish spatial correspondence between said surface portions.

* * * * *